United States Patent
Ryu

(10) Patent No.: US 7,412,529 B2
(45) Date of Patent: Aug. 12, 2008

(54) METHOD FOR PROCESSING SESSION INFORMATION OF SESSION INITIATION PROTOCOL SYSTEM AND RECORDED MEDIUM THEREOF

(75) Inventor: Jee-Young Ryu, Suwon (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 685 days.

(21) Appl. No.: 10/702,589

(22) Filed: Nov. 7, 2003

(65) Prior Publication Data
US 2004/0095938 A1    May 20, 2004

(30) Foreign Application Priority Data
Nov. 12, 2002   (KR)  .................... 10-2002-0070097

(51) Int. Cl.
   *G06F 15/16*   (2006.01)
(52) U.S. Cl. .................. 709/230; 709/203; 709/227; 370/392; 370/466; 370/467
(58) Field of Classification Search ......... 709/202–203, 709/227–228, 230; 370/259–260, 351–352, 370/389, 392, 401, 466–467
See application file for complete search history.

(56) References Cited
U.S. PATENT DOCUMENTS

| | | | |
|---|---|---|---|
| 6,625,141 B1 * | 9/2003 | Glitho et al. ............... | 709/227 |
| 6,678,735 B1 * | 1/2004 | Orton et al. ................. | 709/230 |
| 6,847,988 B2 * | 1/2005 | Toyouchi et al. ............ | 709/203 |
| 6,958,994 B2 * | 10/2005 | Zhakov et al. .............. | 370/352 |
| 6,970,930 B1 * | 11/2005 | Donovan ..................... | 709/227 |
| 6,976,081 B2 * | 12/2005 | Worger et al. ............... | 709/230 |
| 6,988,143 B2 * | 1/2006 | O'Neill et al. .............. | 709/230 |
| 7,058,068 B2 * | 6/2006 | Gawargy et al. ............ | 370/352 |
| 7,120,141 B2 * | 10/2006 | Kikinis ....................... | 370/466 |
| 7,170,863 B1 * | 1/2007 | Denman et al. ............. | 370/260 |
| 7,243,162 B2 * | 7/2007 | O'Neill et al. .............. | 709/230 |
| 7,349,369 B2 * | 3/2008 | Tsirtsis et al. ............... | 709/227 |

* cited by examiner

*Primary Examiner*—Bharat N Barot
(74) *Attorney, Agent, or Firm*—Robert E. Bushnell, Esq.

(57) ABSTRACT

A method for processing session information of an Internet protocol voice call system using a session initiation protocol (SIP), extracting session information by parsing a SIP Session Protocol header (SIPSP Hdr) only without parsing a session initiation message, by stipulating a session protocol layer in the session initiation protocol and attaching a header of the session protocol layer to the session initiation message, thereby performing communication between a client and a server. The session protocol layer being formed between a UDP (User Datagram Protocol) layer and an SIP application layer.

17 Claims, 7 Drawing Sheets

METHOD FOR PROCESSING SESSION INFORMATION OF SESSION INITIATION PROTOCOL SYSTEM AND RECORDED MEDIUM THEREOF

CLAIM OF PRIORITY

This application makes reference to and claims all benefits accruing under 35 U.S.C §119 from an application entitled METHOD FOR PROCESSING SESSION INFORMATION OF SESSION INITIATION PROTOCOL SYSTEM AND RECORDED MEDIUM THEREOF earlier filed in the Korean Industrial Property Office on Nov. 12, 2002, and there duly assigned Serial No. 2002-70097 by that Office.

BACKGROUND OF THE INVENTION

1. Field of the Invention

The present invention generally relates to a method for processing session information of a session initiation protocol system and a recorded medium thereof.

2. Description of the Related Art

The Session Initiation Protocol (SIP) is an IETF standard protocol for initiating an interactive user session that involves multimedia elements such as video, voice, chat, gaming, and virtual reality. Like HTTP (Hypertext Transfer Protocol) or SMTP (Simple Mail Transfer Protocol), SIP works in the Application layer of the Open Systems Interconnection (OSI) communications model. The Application layer is the level responsible for ensuring that communication is possible.

The Session Initiation Protocol (SIP) is an application-layer control (signaling) protocol for creating, modifying and terminating sessions with one or more participants. These sessions include Internet multimedia conferences, Internet telephone calls and multimedia distribution. Members in a session can communicate via multicast or via a mesh of unicast relations, or a combination of these.

SIP invitations used to create sessions carry session descriptions which allow participants to agree on a set of compatible media types. SIP supports user mobility by proxying and redirecting requests to the user's current location. Users can register their current location. SIP is not tied to any particular conference control protocol. SIP is designed to be independent of the lower-layer transport protocol and can be extended with additional capabilities.

SIP can establish multimedia sessions or Internet telephony calls, and modify, or terminate them. The protocol can also invite participants to unicast or multicast sessions that do not necessarily involve an initiator. Because the SIP supports name mapping and redirection services, it makes it possible for users to initiate and receive communications and services from any location, and for networks to identify the users where ever they are. SIP is a request-response protocol, dealing with requests from clients and responses from servers. Participants are identified by SIP URLs (Universal Resource Locators) and/or SIP URIs (Universal Resource Identifiers). Requests can be sent through any transport protocol, such as UDP (User Datagram Protocol), SCTP (Stream Control Transmission Protocol), or TCP (Transmission Control Protocol). SIP determines the end system to be used for the session, the communication media and media parameters, and the called party's desire to engage in the communication. Once these are assured, SIP establishes call parameters at either end of the communication, and handles call transfer and termination.

The SIP used when generating, modifying, and completing multimedia sessions or calls between more than one terminal on an Internet protocol-based network is an application layer control protocol, and such sessions include multimedia conference, Internet telephone call, remote education, etc.

The SIP has been modeled on the basis of SMTP, e-mail, HTTP, and the web, among others. The SIP can be called a client-server protocol for sending a response by a server when a client sends a request message.

In general, in the client/server programming model, a server is a program that awaits and fulfills requests from client programs in the same or other computers. A given application in a computer may function as a client with requests for services from other programs and also as a server of requests from other programs. Although the client/server idea can be used by programs within a single computer, it is a more important idea in a network. In a network, the client/server model provides a convenient way to interconnect programs that are distributed efficiently across different locations. Specific to the Web, a Web server is the computer program (housed in a computer) that serves requested HTML pages or files. A Web client is the requesting program associated with the user. The Web browser in a personal computer is a client that requests HTML files from Web servers.

The SIP reuses syntax and semantics of HTTP in many parts including response code architecture, a message header, and the entire operation process, and carries out transactions similar to the HTTP.

In addition, unlike HTTP and SMTP, the SIP can be executed on a TCP upper or a UDP upper. The SIP provides a mechanism for securing reliability, and a UDP can multicast SIP messages. By multicasting, it is possible to perform group invitation and basic ACD (Automatic Call Distribution).

UDP is a communications protocol that offers a limited amount of service when messages are exchanged between computers in a network that uses the Internet Protocol (IP). UDP is an alternative to the Transmission Control Protocol (TCP) and, together with IP, is sometimes referred to as UDP/IP. Like the Transmission Control Protocol, UDP uses the Internet Protocol to actually get a data unit (called a datagram) from one computer to another. Unlike TCP, however, UDP does not provide the service of dividing a message into packets (datagrams) and reassembling it at the other end. Specifically, UDP doesn't provide sequencing of the packets that the data arrives in. This means that the application program that uses UDP must be able to make sure that the entire message has arrived and is in the right order. Network applications that want to save processing time because they have very small data units to exchange (and therefore very little message reassembling to do) may prefer UDP to TCP. The Trivial File Transfer Protocol (TFTP) uses UDP instead of TCP.

UDP provides two services not provided by the IP layer. It provides port numbers to help distinguish different user requests and, optionally, a checksum capability to verify that the data arrived intact.

In the Open Systems Interconnection (OSI) communication model, UDP, like TCP, is in layer 4, the Transport Layer.

First, the SIP messages will be described as follows.

The SIP messages include a request message sent to a server from a client and a response message sent to the client from the server. The SIP messages are composed of a start line, a header field, and a message body. Various header fields have information on call services, addresses, and protocol properties. The SIP request message is composed of 6 requests, or messages, such as INVITE request, ACK request, BYE request , CANCEL request, REGISTER request , and OPTIONS request.

The INVITE request is the most basic method of starting a call between the server and the client, making a user and a service participate in a session, and includes addresses of a sender and a receiver, subject of the call, priority of the call, call routing request, and desirable response properties.

A body of a request is described by an SDP (Session Description Protocol), textual syntax for describing unicast and multicast multimedia sessions. A register for sending location information to an SIP server informs the user how the SIP server maps an incoming address with an outgoing address.

The BYE request completes connections between people who participate in a conference, and the OPTIONS request has information on capability of the receiver, then the ACK request confirms message exchanges. The user agent client uses BYE request to indicate to the server that it wishes to release the call. A BYE request is forwarded like an INVITE request and may be issued by either caller or callee. A party to a call should issue a BYE request before releasing a call ("hanging up").

The ACK request confirms that the client has received a final response to an INVITE request. (ACK request is used only with INVITE requests.)

The CANCEL request cancels a pending request, but does not affect a completed request. A request is considered completed if the server has returned a final status response.

When a receiver receives a request message, the receiver responds to the request message by an SIP response message. A response state code is similar to an HTTP/1.1 response code, but it is an expanded type, and not all HTTP/1.1 response codes are applied like that. The response state code is shown in types of 1 xx, 2 xx, 3 xx, 4 xx, 5 xx, and 6 xx.

The 1 xx(Informational) shows that it receives a request and continues to process the request. 1 xx responses are provisional, other responses are considered final. The 2 xx(Success) means that an action was successfully received, understood, and accepted. The 3 xx(Redirection) shows that another action is necessary to complete the request, and the 4 xx (Client Error) means that the request includes bad syntax or cannot be performed in the server. The 5 xx (Server Error) means that the server did not clearly process an apparently valid request, and the 6 xx (Global Error) shows that the request cannot be fulfilled at any server.

FIG. 1 illustrates OSI 7 layer models and a structure of a UDP-based SIP stack. Like shown, an SIP is defined as a upper layer of UDP included in a fourth layer of the OSI 7 layer models. Since there is no session layer corresponding to a layer 5 in an existing SIP stack, when SIP sessions should be divided in an SIP application program, contents of SIP messages received from an application layer are parsed to detect the sessions.

FIG. 2 illustrates call setup and completion procedures of a basic SIP call. Referring to FIG. 2, a method of detecting an SIP session will be described as follows.

A setup of the SIP call begins when a client (10) sends an INVITE request to a server (20). The client (10) creates a new session before a new call setup starts. When the server (20) receives the INVITE request for a new call from the client (10), it creates a new session. If it is possible to set up a normal call for the INVITE request received in the server (20) from the client (10), the server sends a 200 OK message to the client. When the client (10) transmits an ACK request to the server (20) in response to the 200 OK message, a call setup is completed. After the call setup, it is possible to have a SESSION (conversation) between the client (10) and the server (20).

A call completion procedure can begin by the client(10) or the server(20) after the call setup. After an SIP endpoint that wants to a call completion transmits a BYE request to the other party, and after the 200 OK message is received from the other party, a call is normally completed. When the SIP endpoint transmitting the BYE message receives the 200 OK message from the other party, it deletes the session. The SIP endpoint receiving the BYE message deletes the session after transmitting the 200 OK message to the other party.

The SIP server (20) can simultaneously receive call setup requests from many clients (10). Thus, it is impossible to manage sessions with only SIP message types such as the INVITE request or 200 OK message. Since the SIP messages have inherent Call-IDs for each call, the sessions are managed by using Call-ID included in the messages with the SIP message types.

However, the problems of the prior art can be largely summarized into two as follows. First, message parsing in an application layer is necessary even though only session layer information is required. Since there is no session layer in an existing SIP stack, if sessions should be divided, the application layer has to parse all SIP messages to detect the sessions.

FIG. 3 shows an SIP load distribution function in an existing router. Referring to FIG. 3, an example of requiring SIP session information only will be described as follows. In the drawing, an SIP server pool (220) is composed of many SIP servers (220a, 220b, 220n) performing the same function. When a router (330) having the SIP load distribution function receives service requests from SIP clients (110a, ..., 110m), it distributes the service requests of the clients to the servers according to a load of the servers of the SIP server pool (220). Because the router (330) for distributing SIP load should transmit all messages received from the same clients to the same servers for the same call, SIP session management is essential.

The existing router described in FIG. 3 manages SIP sessions in the following method. If the router (330) receives SIP messages from the clients, it detects message types and Call-IDs by parsing the SIP messages. If the message types are INVITE request, the router searches whether sessions corresponding to Call-IDs included in the INVITE request exist. If the sessions do not exist, the router creates a new session, and selects a server having the lowest load among the servers of the server pool (220), then stores mapping information between the clients and the servers as session information. The mapping information stored in the sessions includes Call-IDs, SIP client IP and port, SIP server IP and port, etc. If the router receives other messages as well as the INVITE request from the clients, and sessions corresponding to Call-IDs included in the received messages exist, the router transmits all messages received from the same clients for the same call to the same servers by using the stored session information.

Session deletion in the router is performed in a moment when a 200 OK message for a BYE request is transceived to the clients or the servers. Since the 200 OK message is used as a response for a BYE request as well as a response for other SIP message such as INVITE request or CANCEL request, the router should always maintain information on whether a response for the 200 OK message is received from what kind of message. In other words, it is required to maintain history of transceived messages, and to perform session management in reference to contents of previously-transceived messages as well as present messages.

Second, the time for session matching is long.

A Call-ID general-header field uniquely identifies a particular invitation or all registrations of a particular client.

Since Call-IDs included in the SIP messages are used as key values used to search sessions, time for searching the Call-IDs by parsing the messages is necessary. Furthermore, the Call-IDs should be globally unique defined to prevent collision between all clients using the same SIP service. Thus, the Call-IDs are generated in a very long string type, including a host name and a domain name, to secure global uniqueness. When searching sessions by using the Call-IDs in the long string type, it causes a problem that time for performing a string matching process becomes long.

SUMMARY OF THE INVENTION

It is therefore an object of the present invention to provide a method for processing session information of a session initiation protocol system and a recorded medium thereof for easily controlling sessions and increasing session management performance by setting a session layer protocol between an SIP layer and a UDP layer in an SIP stack.

It is another object of the present invention to provide session management that can be easily and conveniently implemented, because it is unnecessary to maintain transceiving history of messages.

In addition, it is an object to reduce the time for session matching, because sessions are divided by using integer-type session IDs instead of very long string-type Call-IDs.

To accomplish the above objects, according to one aspect of the present invention, the present invention provides a method of processing session information of a client performing communication with an arbitrary server in an Internet protocol voice call system using a session initiation protocol. First, an arbitrary message for a call processing request to the server is generated. A SIP Session Protocol header is generated, including session identifier and flag for indicating a start and an end of a session by corresponding to a kind of the generated message. The SIP Session Protocol header is attached to the generated message, and the message with the SIP Session Protocol header is transmitted to the server. In the meantime, if the arbitrary message and the SIP Session Protocol header attached to the message are received from the server, the corresponding SIP Session Protocol header is parsed to extract the flag and the session identifier from the SIP Session Protocol header. A session processing is performed according to the extracted flag and the session identifier.

According to another aspect of the present invention, the present invention provides a method for processing session information of a server performing communication with an arbitrary client in an Internet protocol voice call system using a session initiation protocol. First, an arbitrary message generated for a call processing request from the client is received, and a SIP Session Protocol header is received, including session identifier and flag for indicating a start and an end of a session by corresponding to a kind of the generated message. The received SIP Session Protocol header is parsed to extract the flag and the session identifier from the corresponding SIP Session Protocol header. A corresponding session processing is performed according to the extracted flag and the session identifier. For a result of the performed session processing, an arbitrary response message to be transmitted to the client is generated. A SIP Session Protocol header is generated, including session identifier and flag for indicating a start and an end of a session by corresponding to a kind of the generated message. The SIP Session Protocol header is attached to the generated message, and the message with the SIP Session Protocol header is transmitted to the client.

According to another aspect of the present invention, programs of commands executable by a digital processing device are concretely implemented in order to carry out a method for processing session information of a client performing communication with an arbitrary server in an Internet protocol voice call system using a session initiation protocol, and a recorded medium readable by the digital processing device is provided. In a method for processing session information of a client recorded in the recorded medium, first, an arbitrary message for a call processing request to the server is generated. A SIP Session Protocol header is generated, including session identifier and flag for indicating a start and an end of a session by corresponding to a kind of the generated message. The SIP Session Protocol header is attached to the generated message, and the message with the SIP Session Protocol header is transmitted to the server. Meanwhile, when the arbitrary message and the SIP Session Protocol header attached to the message are received from the server, the corresponding SIP Session Protocol header is parsed to extract the session identifier and the flag from the SIP Session Protocol header. A session processing is performed according to the extracted flag and the session identifier.

According to another aspect of the present invention, programs of commands executable by a digital processing device are concretely implemented in order to carry out a method for processing session information of servers performing communication with an arbitrary client in an Internet protocol voice call system using a session initiation protocol, and a recorded medium readable by the digital device is provided. In a method for processing session information of servers recorded in the recorded medium, first, an arbitrary message generated for a call processing request from the client is received, and a SIP Session Protocol header is received, including session identifier and flag for indicating a start and an end of a session by corresponding to a kind of the generated message. The received SIP Session Protocol header is parsed to extract the session identifier and the flag from the corresponding SIP Session Protocol header. A corresponding session processing is performed according to the extracted flag and the session identifier. For a result of the performed session processing, an arbitrary response message to be transmitted to the client is generated. A SIP Session Protocol header is generated, including session identifier and flag for indicating a start and an end of a session by corresponding to a kind of the generated message. The SIP Session Protocol header is attached to the generated message, and the message with the SIP Session Protocol header is transmitted to the client.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
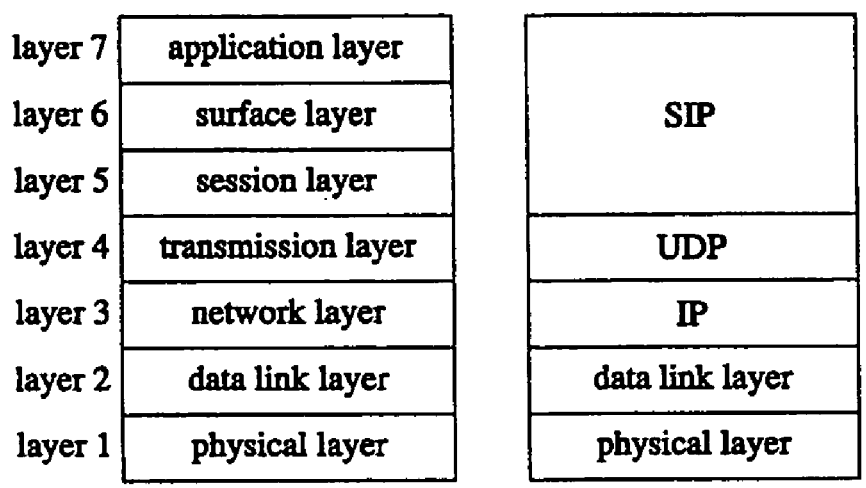
FIG. 1 illustrates OSI 7 layer models and a structure of a UDP-based SIP stack of prior art.
Figure 2:
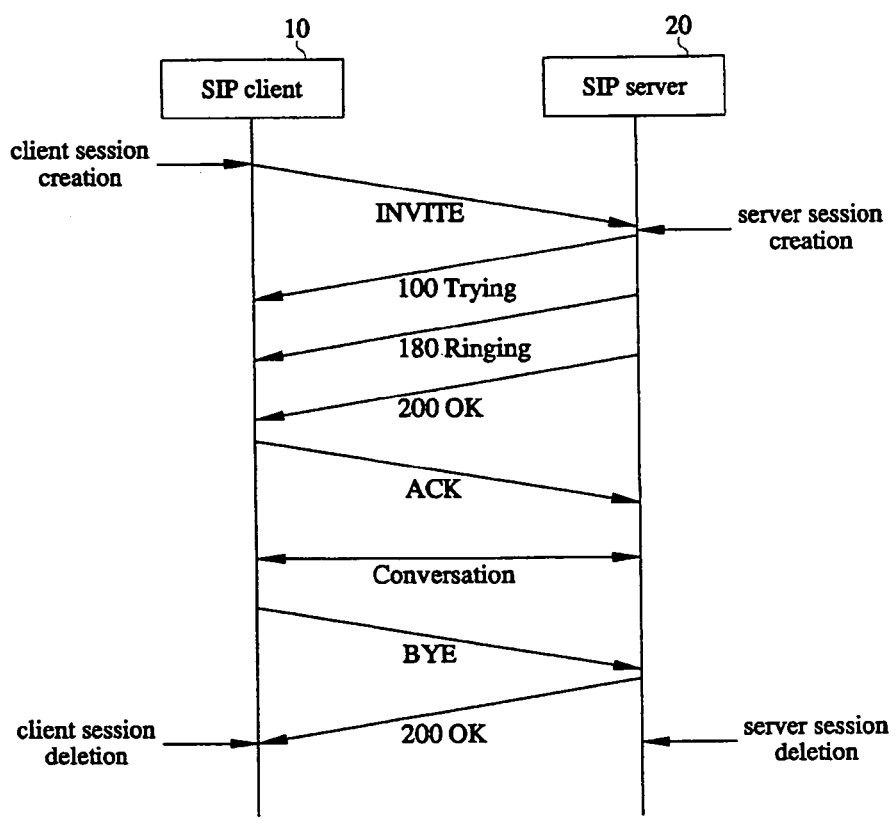
FIG. 2 is a diagram illustrating basic SIP call setup and call completion procedures of prior art.
Figure 3:
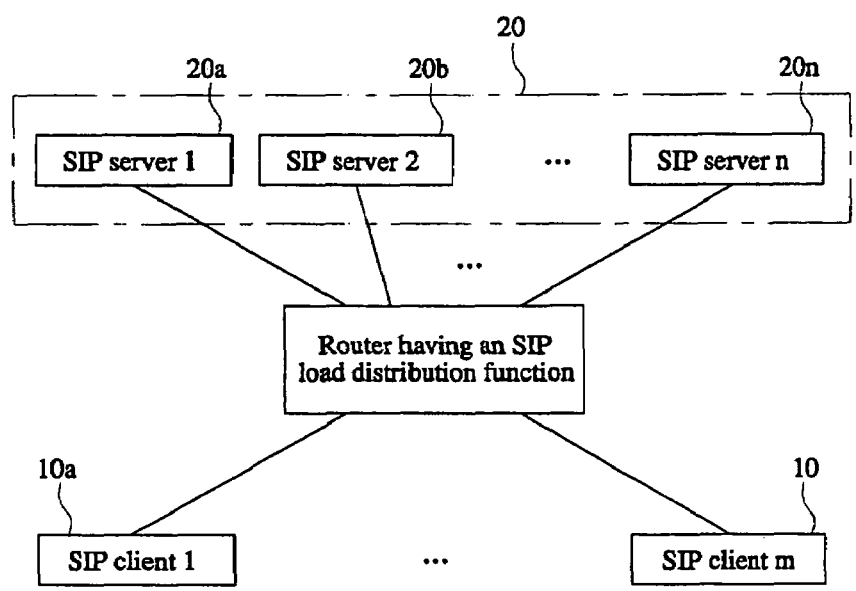
FIG. 3 is a conceptional diagram illustrating an SIP load distribution function in a router.

The present invention will now be described more fully hereinafter with reference to the accompanying drawings, in which preferred embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art. In the drawings, the thickness of layers and regions are exaggerated for clarity. It will also be understood that when a layer is referred to as being "on" another layer or substrate, it can be directly on the other layer or substrate or intervention layers may be also be present. Moreover, each embodiment described and illustrated herein includes its complementary conductivity type embodiment as well.

Hereinafter, the present invention will be described in detail in reference to the accompanying drawings.

Figure 4:
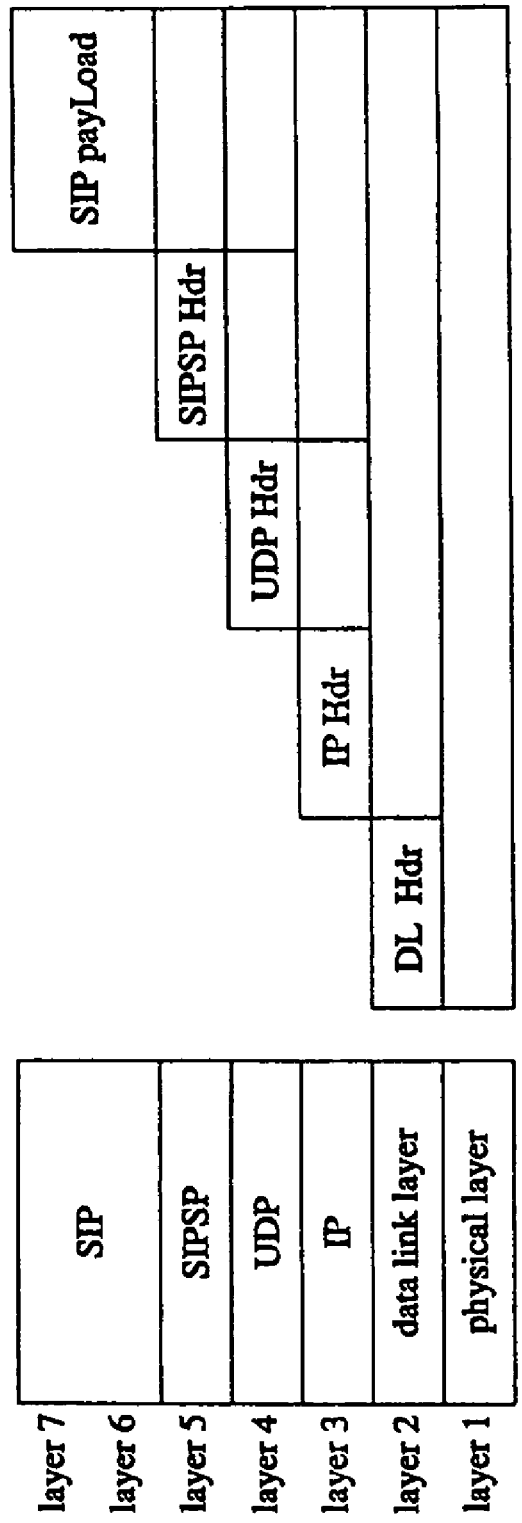
FIG. 4 is a structure chart illustrating a session initiation protocol stack in accordance with the present invention.

FIG. 4 illustrates a structure of a session initiation protocol stack in accordance with the present invention. Referring to FIG. 4, the stack structure by the present invention forms a physical layer as a first layer; a data link layer as a second layer; an IP layer, for the network layer, as a third layer; a UDP layer, for the transport layer, as a fourth layer; an SIPSP layer, for the session layer as a fifth layer; and an SIP layer, for an application layer, as a final layer. That is, an SIPSP (SIP Session Protocol) corresponding to the fifth layer is defined in the SIP stack.

Accordingly, headers are attached to each layer. In another words, to an SIP payload corresponding to SIP messages, an SIPSP header, a SIP Session Protocol header (SIPSP Hdr) is attached, a UDP header (UDP Hdr), a header of the transport layer is attached, an IP header (IP Hdr), a header of the network layer is attached, and a header (DL Hdr) of the data link layer is attached.

Here, other headers except a SIP Session Protocol header will not be described separately, since they comply with standards of a general session initiation protocol.

In the meantime, the SIP Session Protocol header (SIPSP Hdr) has the size of 5 octets, and is located between the SIP payload and the UDP header. The SIP Session Protocol header (SIPSP Hdr) includes a session identifier and a flag for indicating a start and an end of a session by corresponding to a kind of a generated message.

A client attaches the SIP Session Protocol header (SIPSP Hdr) to an arbitrary message to be transmitted to a server, and transmits the message with the SIP Session Protocol header (SIPSP Hdr) to the server. And, when the arbitrary message and the SIP Session Protocol header (SIPSP Hdr) attached to the message are received from the server, the client extracts the session identifier and the flag from the SIP Session Protocol header (SIPSP Hdr) by parsing the corresponding SIP Session Protocol header (SIPSP Hdr), and performs a session processing according to the extracted flag and the session identifier.

Figure 5:
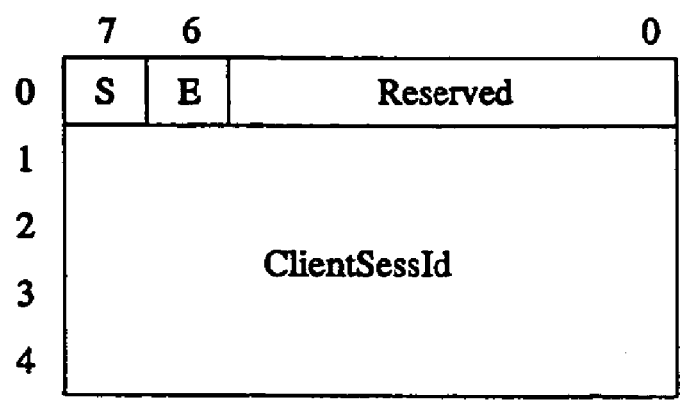
FIG. 5 is a format diagram of an SIP Session Protocol header in accordance with the present invention.

FIG. 5 illustrates a concrete format of a SIP Session Protocol header (SIPSP Hdr). Referring to FIG. 5, the SIP Session Protocol header (SIPSP Hdr) uses 1 octet of 5 octets as a flag for indicating a start and an end of a session, and uses 4 octets as session identifiers of clients. That is, the first octet indicates the start and the end of the session as the flag, and the clients create the remaining four octets when sessions are generated in the clients with session identifier values of the clients.

Session identifiers of the clients are uniquely generated within IPs and ports of the clients, and all messages transceived between the clients and a server have the same values for the same sessions until the sessions are completed. That is, although two arbitrary sessions have the same identifier, the two session have unique identity as sessions distinguished between each other, if each session is within distinguished IPs and ports.

The flag assigns one bit to a session start flag for displaying the start of a session, assigns one bit to a session end flag for displaying the end of the session, and assigns 6 bits reserved for future utility.

In the drawing, an 'S (1-bit)' is a flag for displaying the start of the session, and '1' means the session start.

An 'E (1-bit)' is a flag for displaying the end of the session, and '1' means the session end. The 'Reserved (6-bits)' means 'Reserved for future', initialized as '0'. A 'clientSessId (4 octets)' means a client session identifier.

Figure 6:
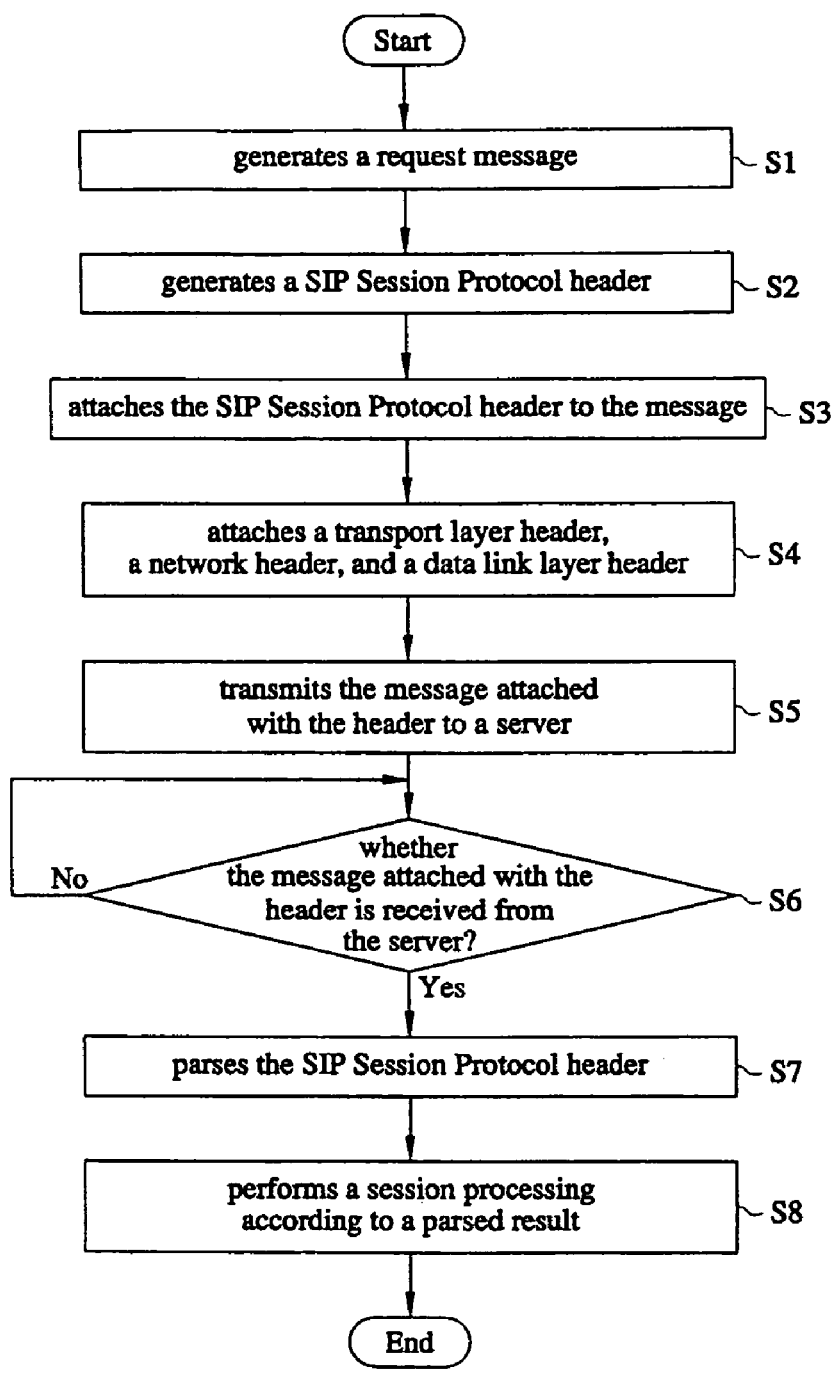
FIG. 6 is a flow chart of processing session information performed in a client of a session initiation system in accordance with the present invention.

FIG. 6 is a flow chart of processing session information performed in a client of a session initiation system in accordance with the present invention.

Referring to FIG. 6, first, an arbitrary message for a call processing request to a server is generated (S1). A SIP Session Protocol header (SIPSP Hdr), is generated, including session identifier and flag for indicating a start and an end of a session by corresponding to a kind of the generated message (S2). The SIP Session Protocol header (SIPSP Hdr) is attached to the generated message (S3). A transport layer header, a network layer header, and a data link layer header are sequentially attached in the state of the SIP Session Protocol header (SIPSP Hdr) being attached (S4). Then, the message, with the attached headers, is transmitted to the server (S5).

Meanwhile, an arbitrary message and a SIP Session Protocol header (SIPSP Hdr) attached to the message can be received from the server. In another words, it is decided whether the message attached with the header is received from the server (S6). If so, the SIP Session Protocol header (SIPSP Hdr) is parsed to extract the session identifier and the flag from the SIP Session Protocol header (SIPSP Hdr) (S7). Then, a session processing is performed according to the extracted flag and the session identifier (S8).

A concrete operation of a client in accordance with each message is as follows.

When the client starts a new call to a server, that is, when sending an INVITE request, the IP/PORT of the client creates an inherent session identifier.

A SIP Session Protocol header (SIPSP Hdr) is attached to all SIP messages transmitted to the server from the client. A client session ID (ClientSessId) of the SIP Session Protocol header (SIPSP Hdr) has a value of the session identifier generated in the client, and values of the 'S' and 'E' flags are set to the following values according to types of the SIP requests/messages.

Namely, as for the INVITE request, the 'S' flag is set to '1', and the 'E' flag is set to '0'.

As for a 200 OK message to the BYE request, the 'S' flag is set to '0', and the 'E' flag is set to '1'. In a certain time (capable of retransmitting the message, i.e., reINVITE) after the 200 OK message is transmitted to the server, session information is deleted.

Other requests/messages set both the 'S' flag and the 'E' flag to '0'. In the meantime, if a message is received from the server, a corresponding session is searched by using a client session ID (ClientSessId) value of the SIP Session Protocol header (SIPSP Hdr) as a key, and the corresponding session processes the message.

If an 'E' flag of a SIP Session Protocol header (SIPSP Hdr) of the received message is '1', the corresponding session is deleted in a certain time (capable of retransmitting the message) after processing the message.

Figure 7:
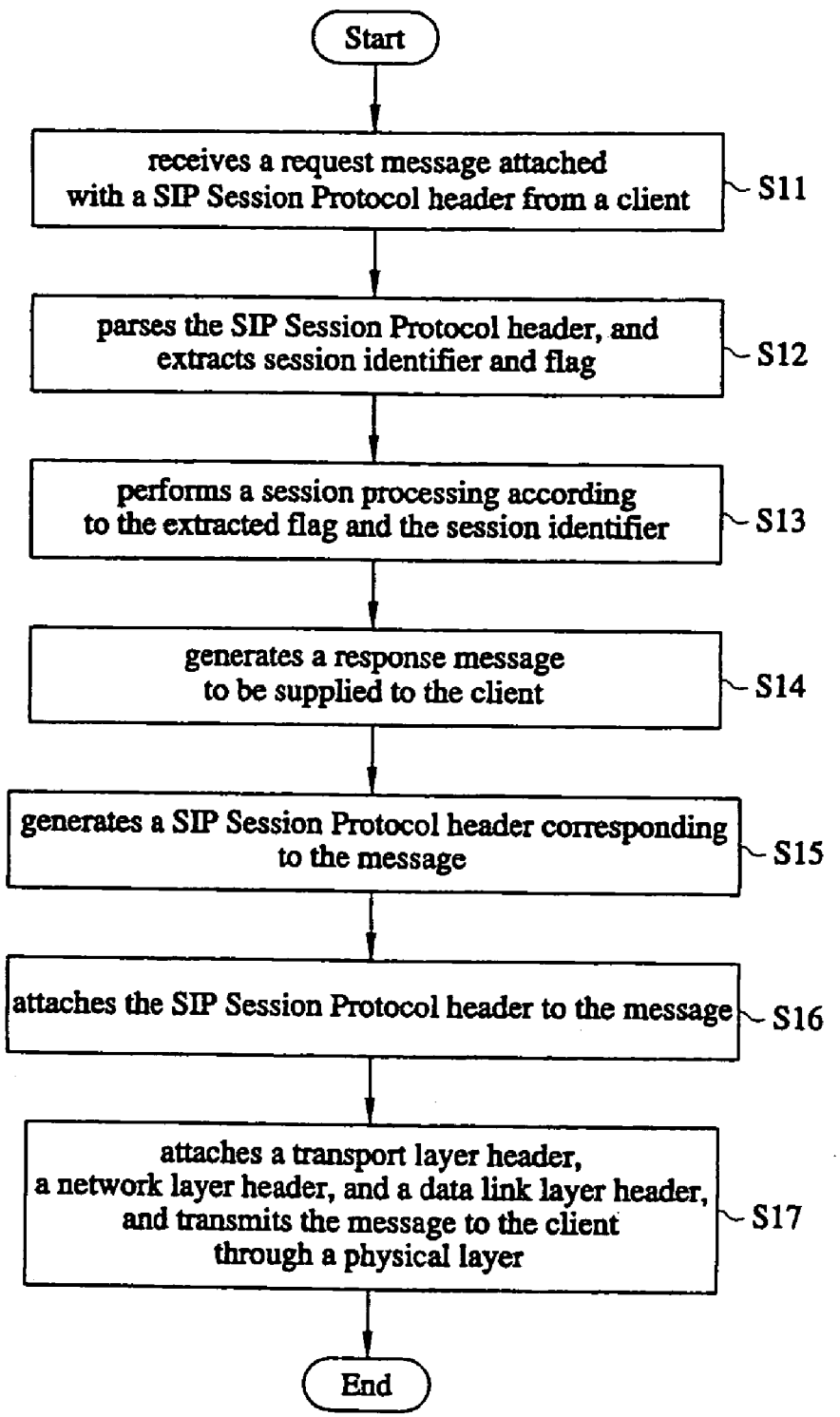
FIG. 7 is a flow chart of processing session information performed in a server of a session initiation system in accordance with the present invention.

FIG. 7 is a flow chart of processing session information performed in a server of a session initiation system in accordance with the present invention.

Referring to FIG. 7, first, with an arbitrary message generated for a call processing request from a client, a SIP Session Protocol header (SIPSP Hdr) is received, including session identifier and flag for indicating a start and an end of a session by corresponding to a kind of the generated message (S11). The received SIP Session Protocol header (SIPSP Hdr) is parsed to extract the session identifier and the flag from the corresponding SIP Session Protocol header (SIPSP Hdr) (S12). A corresponding session processing is performed according to the extracted flag and the session identifier (S13).

Here, when performing the session processing, it is determined whether a session according to the extracted client session identifier exists. If the corresponding session exists, a message processing in accordance with corresponding session information is carried out. If the according session does not exist, new arbitrary session information is generated.

For a result of the performed session processing, an arbitrary response message to be transmitted to the client is generated (S14). A SIP Session Protocol header is generated, including session identifier and flag for indicating a start and an end of a session by corresponding to a kind of the generated message (S15). The SIP Session Protocol header (SIPSP Hdr) is attached to the generated message (S16). Next, a transport layer header, a network layer header, and a data link layer header are attached, and are transmitted to the client through a physical layer (S17).

A concrete operation of a server in accordance with each message is as follows.

If an 'S' flag of a SIP Session Protocol header (SIPSP Hdr) of a message received from the client is '1', a new session is generated, and a client IP address, a port address, and session ID (ClientIp, ClientPort, ClientSessId) are stored in the session.

If the 'S' flag of the SIP Session Protocol header (SIPSP Hdr) of the message received from the client is '0', a session corresponding to the client IP, the port, and the session ID (ClientIp, ClientPort, ClientSessId) is searched, and the corresponding session processes the message.

If an 'E' flag is '1', session information is deleted after a certain time (capable of retransmitting the message).

The SIP Session Protocol header (SIPSP Hdr) is attached to all SIP messages transmitted to the client from the server. A client session ID (ClientSessId) of the SIP Session Protocol header has a value of a client session identifier (Client Session Identifier) stored in the session information. Values of the 'S' and 'E' flags are set to the following values according to types of the SIP requests/messages.

A 200 OK message for a BYE request sets the 'S' flag to '0', and sets an 'E' bit to '1'.

In case of other messages, both the 'S' flag and the 'E' flag are set to '0'. If the 'E' flag of the SIP Session Protocol header transmits a message set to '1', the session information is deleted after a certain time (capable of retransmitting).

In an embodiment so far, if an arbitrary message is an INVITE request when setting a flag in a SIP Session Protocol header, a session start flag is set to '1', and a session end flag is set to '0'. And, if the arbitrary message is a BYE request, the session start flag is set to '0', and the session end flag is set to '1'. In case of other session initiation requests/messages, the session start flag and the session end flag are set to '0', respectively.

Furthermore, as an alternative embodiment, if an arbitrary message is an INVITE request when setting a flag in a SIP Session Protocol header, a session start flag is set to '0', and a session end flag is set to '1'. And, if the arbitrary message is a BYE request, the session start flag is set to '1', and the session end flag is set to '0'. In case of other session initiation requests/messages, the session start flag and the session end flag are set to '1', respectively.

According to the present invention, even though SIP messages are not parsed in an application layer, session information can be extracted by parsing a SIP Session Protocol header only, thereby generating or deleting a session. Thus, session management can be easily and conveniently implemented, since it is unnecessary to maintain transceiving history of messages. In addition, sessions are divided by using integer-type session IDs instead of very long string-type Call-IDs, thus time for session matching is reduced.

What is claimed is:

1. A method for processing session information of a client performing communication with an arbitrary server in an Internet protocol voice call system using a session initiation protocol, comprising steps of:

generating an arbitrary message for a call processing request to the server;

generating a SIP (Session Initiation Protocol) Session Protocol header as an Open systems Interconnection (OSI) fifth layer session including a session identifier and a flag, for indicating a start and an end of a session, and being located between an SIP payload and a UDP (User Datagram Protocol) header, by corresponding to a kind of the generated message;

attaching the generated SIP Session Protocol header to the message, and transmitting the message to the server;

parsing the SIP Session Protocol header when the arbitrary message and the SIP Session Protocol header attached to the message are received from the server, and extracting the session identifier and the flag from the SIP Session Protocol header; and performing a session processing according to the extracted flag and the session identifier.

2. The method of claim 1, wherein in a session initiation protocol stack composed of a physical layer protocol, a data link layer protocol, a network layer protocol, a transport layer protocol, and an application layer protocol, the SIP Session Protocol header is generated by using a session layer protocol implemented between the transport layer protocol and the application layer protocol.

3. The method of claim 1, wherein the SIP Session Protocol header uses 1 octet as a flag for indicating the start and the end of the session, and uses 4 octets as session identifiers of the client.

4. The method of claim 3, wherein the flag assigns 1 bit to a session start flag for displaying the start of the session, assigns 1 bit to a session end flag for displaying the end of the session, and assigns 6 bits reserved for future utility.

5. The method of claim 4, wherein if the session end flag of the SIP Session Protocol header received from the server is set to '1', the corresponding session is ended in a certain time after the session end flag is received.

6. The method of claim 4, wherein if the arbitrary message is an INVITE request, the flag sets the session start flag to '1', and sets the session end flag to '0', and if the arbitrary message is a BYE request, the flag sets the session start flag to '0', and sets the session end flag to '1', and if the arbitrary message is neither of INVITE request nor the BYE request, the flag sets both the session start flag and the session end flag to '0'.

7. The method of claim 1, wherein if the session identifiers used for two arbitrary sessions are the same, the two arbitrary sessions each have a unique identity to distinguish the sessions from each other when each session is provided by respective distinguished IPs and ports.

8. A method for processing session information of a server performing communication with an arbitraiy client in an Internet protocol voice call system using a session initiation protocol, comprising steps of:

receiving an arbitrary message generated for a call processing request from the client, and receiving a SIP (Session Initiation Protocol) Session Protocol header corresponding to the message, the SIP Session Protocol header received from the client as an Open systems Interconnection (OSI) fifth layer session located between an SIP payload and a UDP (User Datagram Protocol) header, the SIP Session Protocol header including a session identifier and a flag for indicating a start and an end of a session;

parsing the received SIP Session Protocol header, and extracting the flag and the session identifier from the corresponding SIP Session Protocol header;

performing a corresponding session processing according to the extracted flag and the session identifier;

generating, by the server, an arbitrary response message to be transmitted to the client for a result of the performed session processing;

generating, by the server, a SIP Session Protocol header corresponding to the generated response message, the SIP Session Protocol header including a session identifier and a flag for indicating a start and an end of a session; and attaching the generated SIP Session Protocol header to the response message, and transmitting the response message to the client.

9. The method of claim 8, the step of performing the session processing comprising steps of:

determining whether a session according to the extracted client session identifier is generated; and performing a message processing in accordance with corresponding session information if the according session exists, and generating new arbitrary session information if the according session does not exist.

10. The method of claim 8, wherein in a session initiation protocol stack is composed of a physical layer protocol, a data link layer protocol, a network layer protocol, a transport layer protocol, and an application layer protocol, and the SIP Session Protocol header is generated by including a session layer protocol implemented between the transport layer protocol and the application layer protocol.

11. The method of claim 8, wherein the SIP Session Protocol header uses 1 octet as the flag, the flag indicating the start and the end of the session, and uses 4 octets as session identifiers of clients.

12. The method of claim 11, wherein the flag assigns 1 bit to a session start flag for displaying the start of the session, assigns 1 bit to a session end flag for displaying the end of the session, and assigns 6 bits reserved for future utility.

13. The method of claim 12, wherein if the session start flag is set to '1', a new session is generated, and if the session end flag is set to '1', the corresponding session is terminated a certain time after receiving the session end flag set to '1'.

14. The method of claim 12, wherein if an arbitrary message is an INVITE request, the flag sets the session start flag to '1', and sets the session end flag to '0', and if the arbitrary message is a BYE request, the flag sets the session start flag to '0', and sets the session end flag to '1', and if the message is neither of INVITE request nor the BYE request, the flag sets both the session start flag and the session end flag to '0'.

15. The method of claim 8, wherein if the session identifiers used for two arbitrary sessions are the same, the two arbitrary sessions each have a unique identity to distinguish the sessions from each other when each session is provided by respective distinguished IPs and ports.

16. In a recorded medium readable by a digital processing device, when programs of commands executable by the digital processing device are concretely implemented in order to perform a method for processing session information of a client performing communication with an arbitrary server in an Internet protocol voice call system using a session initiation protocol, the method processes the session information of the client, the method comprising steps of:

generating, by the client, a message for a call processing request for transmission to the server;

generating a SIP (Session Initiation Protocol) Session Protocol header as an Open systems Interconnection (OSI) fifth layer session located between an SIP payload and a UDP (User Datagram Protocol) header, the SIP Session Protocol header corresponding to the generated message, the SIP Session Protocol header including a session identifier and a flag for indicating a start and an end of a session;

attaching the generated SIP Session Protocol header to the message, and transmitting the message to the server;

parsing, in the server, the corresponding SIP Session Protocol header when the message and the SIP Session Protocol header attached to the message are received, and extracting the flag and the session identifier from the SIP Session Protocol header; and performing a session processing according to the extracted flag and the session identifier.

17. In a recorded medium readable by a digital processing device, when programs of commands executable by the digital processing device are concretely implemented in order to perform a method for processing session information of a server performing communication with an arbitrary client in an Internet protocol voice call system using a session initiation protocol, the method for processing the session information of the server, comprising the steps of:

receiving an message generated for a call processing request from the client, and receiving a SIP (Session Initiation Protocol) Session Protocol header located between an SIP payload and a UDP (User Datagram Protocol) header, the SIP Session Protocol header being an Open systems Interconnection (OSI) fifth layer session including a session identifier and a flag for indicating a start and an end of a session by corresponding to a kind of the generated message;

parsing the received SIP Session Protocol header, and extracting the flag and the session identifier from the corresponding SIP Session Protocol header;

performing a corresponding session processing according to the extracted flag and the session identifier;

generating a response message to be transmitted to the client as a result of the performed session processing;

generating a SIP Session Protocol header including a session identifier and a flag for indicating a start and an end of a session according to the generated response message; and attaching the generated SIP Session Protocol header to the message, and transmitting the message to the client.

* * * * *